UNITED STATES PATENT OFFICE.

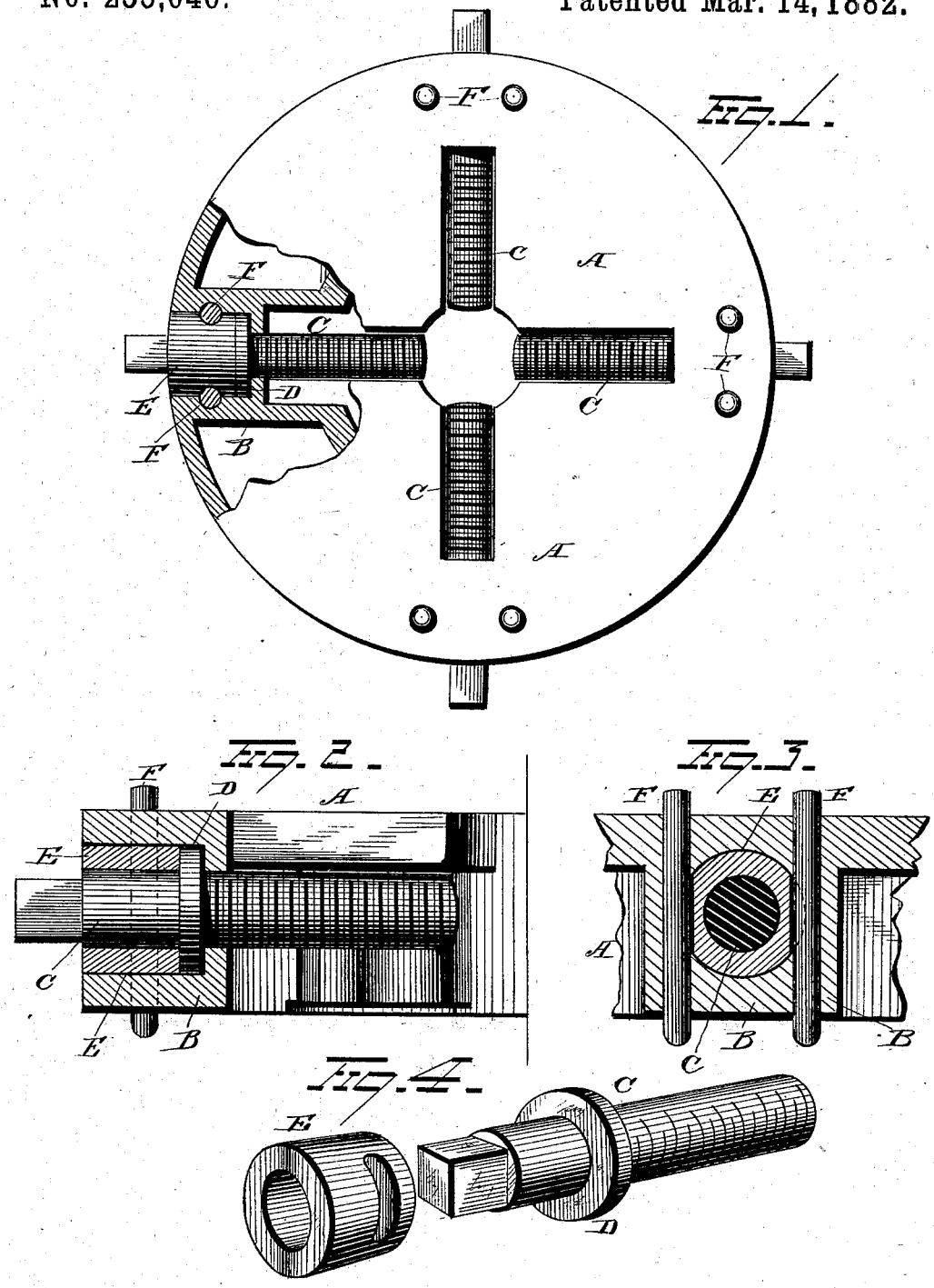

JOHN C. STEVENS, OF NEW HAVEN, CONNECTICUT.

LATHE-CHUCK.

SPECIFICATION forming part of Letters Patent No. 255,046, dated March 14, 1882.

Application filed November 25, 1881. (No model.)

*To all whom it may concern:*

Be it known that I, JOHN C. STEVENS, of New Haven, in the county of New Haven and State of Connecticut, have invented certain new and useful Improvements in Lathe-Chucks; and I do hereby declare the following to be a full, clear, and exact description of the invention, such as will enable others skilled in the art to which it pertains to make and use the same.

My invention relates to an improvement in lathe-chucks, the object of the same being to provide an arrangement of parts for securely holding the operating-spindles in position in the shell while the chuck is in use, and allowing the same to be removed, when desired, for any purpose, without unnecessary trouble and loss of time, the parts being simple in construction and durable and efficient in use.

With these ends in view my invention consists in certain details in construction and combinations of parts, as will be more fully explained, and pointed out in the claims.

In the accompanying drawings, Figure 1 represents a front view of a chuck embodying my improvements. Fig. 2 is a longitudinal section through one spindle and its bearing. Fig. 3 is a transverse section through the dowel-pins for holding the bushing in position, and Fig. 4 represents a detail view of the spindle and bushing.

A represents the shell of the chuck, provided with three or more enlarged portions, B, which latter are countersunk nearly throughout their entire length for the reception of the spindle bearings or bushings, and are further provided with a round opening through the remaining part thereof for the passage of the shank of the spindle.

The spindles C are each provided with the annular ring or collar D, of the same diameter as the bores in which they rest, the said collars being adapted to bear on the internal faces of the enlarged portions of the shell and receive all the pressure and strain from the spindle, and also against the bushings E, which latter prevent the spindles from moving outward. These bushings E are of the same form as the bore or cavity in the enlarged portions of the shell A, and are adapted, when placed in position, to fill up the space in the bores or cavities on the outside of the collars D, so as to prevent any movement of the spindles other than that necessary for the proper adjustment of the jaws. The bushings are centrally bored through their entire length for the passage of the outer end of the spindle, which latter snugly fits therein and prevents the ingress of dirt between the spindle and bushing to the interior of the chuck. When the bushing is placed in position the outer face thereof is adapted to rest flush with the periphery of the chuck, thereby presenting a neat and finished appearance. F are dowel-pins, adapted to pass from the outside of one face of the chuck through the enlarged portions B thereof and impinge on the sides of this bushing E and hold them firmly in position, the said bushing being provided either with holes for the passage of the pins, one or more slots in the periphery thereof, or a gutter passing entirely around the same, in which the pins rest, and which firmly hold the bushing in position. When it is desired to secure the bushing in position without allowing the same to turn, as would be the case were an annular gutter, before referred to, employed, the slots shown in Fig. 4 should be employed, as they hold the bushing firmly in position without any movement whatever.

If desired, I can screw-thread the bushing and provide the countersink with female screw-threads and secure the bushing in that manner, either with or without the dowel-pins; but I prefer the construction shown in the drawings, as it is cheaper and equally efficient in use, while at the same time it allows the spindle to be withdrawn for turning the jaws, so as to present either face thereof to the center or for oiling the parts in a much shorter space of time.

By constructing the parts as above described a strong and durable bearing is formed for the spindle at its outer end, which obviates the necessity of the employment of another bearing at the other end thereof, and enables the chuck to be made lighter and cheaper than those heretofore employed.

When it is desired to withdraw or remove the spindle it is only necessary to knock out the dowel-pins, which leaves the bushing and spindle free to be withdrawn at pleasure. The extreme outer ends of the spindles are adapted to project out beyond the outer face of the bushing, so as to enable the jaws to be moved either toward or away from the center by simply applying an ordinary wrench thereto.

I would have it understood that I do not limit myself to the exact construction of parts shown and described, but consider myself at liberty to make such changes as come within the spirit and scope of my invention.

Having fully described my invention, what I claim as new, and desire to secure by Letters Patent, is—

1. The combination, with the shell of a chuck having recessed enlargements, of spindles provided with collars to bear against the inner walls of the recesses in the enlargements, and bushings secured in said recesses and arranged to bear against the said collars and hold the spindles in position.

2. The combination, with the shell of a chuck having recessed enlargements, of spindles provided with collars to bear against the inner walls of the recesses in the enlargements, bushings to bear against the said collars, and dowel-pins to hold the bushings in position.

In testimony whereof I have signed this specification in the presence of two subscribing witnesses.

JOHN C. STEVENS.

Witnesses:
 W. T. FIELDS,
 ROBERT FOOTE.